(12) United States Patent
Cannon et al.

(10) Patent No.: US 8,654,908 B2
(45) Date of Patent: Feb. 18, 2014

(54) CORRELATION PREVENTION METHODS FOR SATELLITE ADAPTIVE CANCELLATION LINKS

(75) Inventors: Richard Hollingsworth Cannon, Mesa, AZ (US); Louis Dubin, Gilbert, AZ (US); Cris Mamaril, Mesa, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 366 days.

(21) Appl. No.: 13/159,208

(22) Filed: Jun. 13, 2011

(65) Prior Publication Data

US 2011/0243260 A1 Oct. 6, 2011

Related U.S. Application Data

(60) Provisional application No. 61/354,092, filed on Jun. 11, 2010.

(51) Int. Cl.
| | |
|---|---|
| *H04L 25/08* | (2006.01) |
| *H04B 1/10* | (2006.01) |
| *H04L 1/00* | (2006.01) |
| *H03D 1/04* | (2006.01) |
| *H03D 1/06* | (2006.01) |
| *H03K 5/01* | (2006.01) |
| *H03K 6/04* | (2006.01) |

(52) U.S. Cl.
USPC ............ 375/346; 375/285; 375/316; 375/348

(58) Field of Classification Search
USPC .................................. 375/285, 316, 346, 348
See application file for complete search history.

(56) References Cited

U.S. PATENT DOCUMENTS

| | | | | |
|---|---|---|---|---|
| 5,818,882 | A | 10/1998 | Komatsu | |
| 6,859,641 | B2 * | 2/2005 | Collins et al. | 455/63.1 |
| 7,228,107 | B2 * | 6/2007 | Kim | 455/67.13 |
| 8,411,769 | B2 * | 4/2013 | Currivan et al. | 375/260 |
| 2005/0147184 | A1 | 7/2005 | Matsuno | |
| 2010/0202552 | A1 | 8/2010 | Sakai et al. | |

FOREIGN PATENT DOCUMENTS

EP  1198903 B1  4/2002

* cited by examiner

*Primary Examiner* — Ted Wang
(74) *Attorney, Agent, or Firm* — Booth Udall Fuller, PLC

(57) ABSTRACT

A method of reducing signal correlation in a symmetrical adaptive canceller link comprising spectrally inverting one of a first carrier signal and a second carrier signal by causing a spectral inversion of one of the first and second carrier signals using a modulator, transmitting the first and second carrier signals within a bandwidth to a remote receiver using a transmitting device such that a composite carrier signal results, and cancelling at least one of the first carrier signal from the composite carrier signal using a cancellation technique such that the second carrier signal results on one end of the link and the second carrier signal from the composite carrier signal using a cancellation technique such that the first carrier signal results on the opposite end of the link.

18 Claims, 5 Drawing Sheets

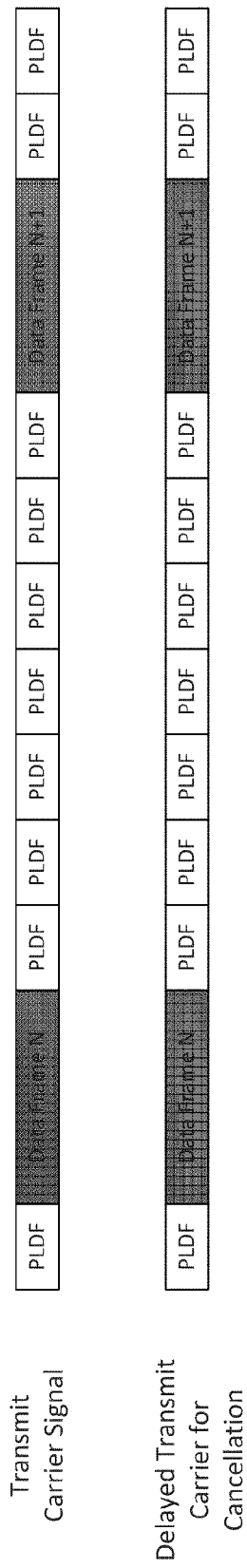
FIG. 3A: Correct Delay alignment for Cancellation
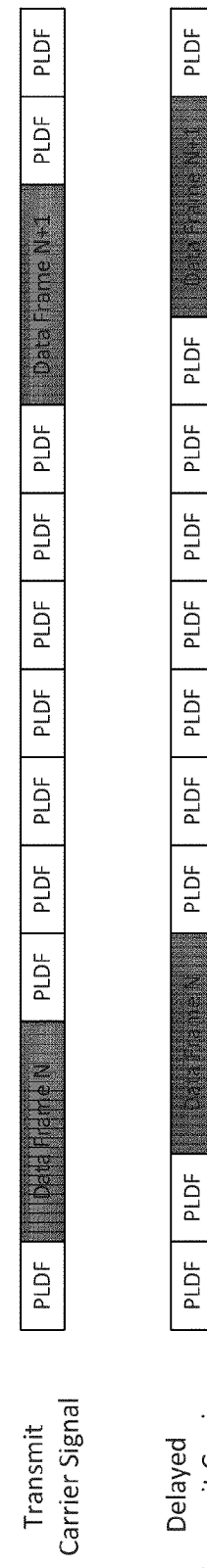
FIG. 3B: Incorrect (aliased) alignment for Cancellation (Note that PLDFs align but Data does not)

CORRELATION PREVENTION METHODS FOR SATELLITE ADAPTIVE CANCELLATION LINKS

CROSS REFERENCE TO RELATED APPLICATIONS

This document claims the benefit of the filing date of U.S. Provisional Patent Application No. 61/354,092, entitled "Correlation Prevention Methods for Satellite Adaptive Cancellation Links" to Richard Hollingsworth Cannon, et al., which was filed on Jun. 11, 2010, the disclosure of which is hereby incorporated entirely by reference herein.

BACKGROUND

1. Technical Field

Aspects of this document relate generally to telecommunication systems and techniques for transmitting data across a telecommunication channel.

2. Background Art

Satellite Carrier Cancellation links can be adversely affected by modulation schemes that cause signal correlation both between a given signal and a delayed version of itself, or periodically between the two signals that need to separated using cancellation techniques.

The conventional Carrier Adaptive Cancellation technique assumes that the desired receive (Rx) signal and the interfering transmit (Tx) signal to be cancelled are different enough that complete cancellation of the delayed transmit signal out of the composite signal will optimally extract the desired Rx signal. This is true for many types of satellite carriers, but problems arise in some cases. A case in point is standardized modulations such as, but not limited to, DVB-S2. DVB-S2 is a specification for Digital Video Broadcasting, defined by the European Telecommunications Standards Institute (ETSI). This specification is identified as ETSI EN 302 307, "Digital Video Broadcasting (DVB) Second generation framing structure channel coding and modulation systems for Broadcasting, Interactive Services, News Gathering and other broadband satellite applications" and is herein incorporated.

Performance degrading correlation can arise here due to the following aspects of the standardized system:

1. The Error Correction engine is standardized on a Low Density Parity Check (LDPC) systematic code and uses a synchronous scrambler. Systematic codes transmit the original message to which parity bits are appended. The input data can be largely repetitive, for example, in the case of test signals or null data. Data scrambling is synchronous for this standard, meaning that each data frame (codeword) gets mixed with the same randomizer signal. Correlation can and does occur during the systematic portion of a data frame.

2. The Physical Layer at the start of each data frame (codeword) is not scrambled, and if the same modulation and coding is used, it generates an identical 90 symbol modulation pattern at the start of each frame.

3. The DVB-S2 standard specifies that in the absence of enough input data being sent to fill all of the data frames (codewords) that the system send short null frames, called Physical Layer Dummy Frames (PLDFs). These PLDFs exactly repeat the modulated sequence every 3330 modulated symbols.

Thus, a need exists for a method of reducing or preventing this correlation to allow robust link performance.

SUMMARY

Implementations of a method of reducing signal correlation in a symmetrical adaptive canceller link may comprise spectrally inverting one of a first carrier signal and a second carrier signal by causing a spectral inversion of one of the first and second carrier signals using a modulator, transmitting the first and second carrier signals within a bandwidth to a remote receiver using a transmitting device such that a composite carrier signal results, and cancelling at least one of the first carrier signal from the composite carrier signal using a cancellation technique such that the second carrier signal results on one end of the link and the second carrier signal from the composite carrier signal using a cancellation technique such that the first carrier signal results on the opposite end of the link.

Particular implementations may comprise one or more of the following additional features. The spectral inversion may be caused by inverting a baseband quadrature arm of one of the first and second carrier signals. The spectral inversion may be caused by swapping I and Q channels of one of the first and second carrier signals. The spectral inversion may be caused by changing a phase of one of the first and second carrier signals at a quadrature mixer. The spectral inversion may be caused by using an inverted upconverter.

The method may further comprise determining whether to spectrally invert the first or second carrier signal by determining a state of a transmit signal spectral invert parameter, a local canceller spectral invert parameter, and a receive signal spectral invert parameter at each end of the adaptive canceller link according to the following chart:

| Tx Spectral Invert | Canceller Inverted | Demodulator Invert | Need to change Tx Invert |
|---|---|---|---|
| 0 | 0 | 0 | Yes |
| 0 | 0 | 1 | No |
| 0 | 1 | 0 | No |
| 0 | 1 | 1 | Yes |
| 1 | 0 | 0 | No |
| 1 | 0 | 1 | Yes |
| 1 | 1 | 0 | Yes |
| 1 | 1 | 1 | No |

The method may further comprise determining whether to spectrally invert the first or second carrier signal at a transmit end of the link and inverting the first or second carrier signal at the transmit end of the link in response to the determination. The method may further comprise delaying the spectral inversion at each end of the link based on a randomized timing schedule. The method may further comprise determining at which end of the link to spectrally invert a carrier signal and spectrally inverting the carrier signal at an end of the link in response to the determination.

Implementations of a method of reducing signal correlation within a symmetrical adaptive canceller link may comprise randomizing data contained within a first carrier signal at a first end of the link using a first scrambler, randomizing data contained within a second carrier signal at a second end of the link using a second scrambler such that a pseudo-random sequence of data results that is different than a random sequence of data resulting at the first end of the link, transmitting the first and second carrier signals within a bandwidth to a remote receiver using a transmitting device such that a composite carrier signal results, and cancelling the first carrier signal from the composite carrier signal using a cancellation technique such that the second carrier signal results.

Particular implementations may comprise one or more of the following additional features. At least one of the scramblers may be a feedback scrambler. The first and second scramblers may be different synchronous scramblers. The method may further comprise using a different seed of a synchronous scrambler at the first and second ends of the link. The method may further comprise using a different gold code at each end of the link to randomize data at the first and second ends of the link. The method may further comprise using a different set of feedback taps in a linear feedback shift register (LFSR) at the first and second ends of the link.

Implementations of a method of reducing signal correlation within a symmetrical adaptive canceller link may comprise offsetting a symbol clock frequency of a first carrier signal on a first end of the link and a symbol clock frequency of a second carrier signal on a second end of the link such that the symbol clock frequencies are different, transmitting the first and second carrier signals within a bandwidth to a remote receiver using a transmitting device such that a composite carrier signal results, and cancelling at least one of the first carrier signal from the composite carrier signal using a cancellation technique such that the second carrier signal results at one end of the link and the second carrier signal from the composite carrier signal using a cancellation technique such that the first carrier signal results at the other end of the link.

Implementations of a method of reducing signal correlation within a symmetrical adaptive canceller link may comprise modulating a first carrier signal at a first end of the link using a first modulator, modulating a second carrier signal at a second end of the link using a second modulator wherein the modulation pattern of the first and second modulators are without pattern repetition during a duration of signal travel between the first and second ends of the link, transmitting the first and second carrier signals within a bandwidth to a remote receiver using a transmitting device such that a composite carrier signal results, and cancelling the first carrier signal from the composite carrier signal using a cancellation technique such that the second carrier signal results.

Particular implementations may comprise one or more of the following additional features. The method may further comprise generating random data at the first end of the link and inserting the random data into the first carrier signal in place of a DVB-S2 physical layer dummy frame (PLDF) data pattern. The method may further comprise replacing a data portion of a DVB-S2 physical layer dummy frame (PLDF) with a pseudo-noise (PN) pattern that is longer than the DVB-S2 PLDF while the DVB-S2 PLDF headers remain unchanged. The method may further comprise randomizing a data portion of a DVB-S2 PLDF using one or more feedback scramblers.

Implementations of a system for reducing signal correlation in a symmetrical adaptive canceller link may comprise a modulator configured to spectrally invert one of a first carrier signal and a second carrier signal by causing a spectral inversion of one of the first and second carrier signals, a transmitter configured to transmit the first and second carrier signals within a bandwidth to a remote receiver such that a composite carrier signal results, and a canceller configured to cancel at least one of the first carrier signal from the composite carrier signal using a cancellation technique such that the second carrier signal results on one end of the link and the second carrier signal from the composite carrier signal using a cancellation technique such that the first carrier signal results on the opposite end of the link.

Particular implementations may comprise one or more of the following additional features. The modulator may be further configured to cause the spectral inversion by inverting a baseband quadrature arm of one of the first and second carrier signals. The modulator may be further configured to cause the spectral inversion by swapping I and Q channels of one of the first and second carrier signals. The modulator may be further configured to cause the spectral inversion by changing a phase of one of the first and second carrier signals at a quadrature mixer. The system may further comprise an inverted upconverter configured to cause the spectral inversion by using an inverted upconverter.

The modulator may be further configured to determine whether to spectrally invert the first or second carrier signal by determining a state of a transmit signal spectral invert parameter, a local canceller spectral invert parameter, and a receive signal spectral invert parameter at each end of the adaptive canceller link according to the following chart:

| Tx Spectral Invert | Canceller Inverted | Demodulator Invert | Need to change Tx Invert |
|---|---|---|---|
| 0 | 0 | 0 | Yes |
| 0 | 0 | 1 | No |
| 0 | 1 | 0 | No |
| 0 | 1 | 1 | Yes |
| 1 | 0 | 0 | No |
| 1 | 0 | 1 | Yes |
| 1 | 1 | 0 | Yes |
| 1 | 1 | 1 | No |

The modulator may be further configured to determine whether to spectrally invert the first or second carrier signal at a transmit end of the link and to invert the first or second carrier signal at the transmit end of the link in response to the determination. The modulator may be further configured to delay the spectral inversion at each end of the link based on a randomized timing schedule. The modulator may be further configured to determine at which end of the link to spectrally invert a carrier signal and spectrally invert the carrier signal at an end of the link in response to the determination.

Implementations of a system of reducing signal correlation within a symmetrical adaptive canceller link may comprise a first scrambler configured to randomize data contained within a first carrier signal at a first end of the link using a first scrambler, a second scrambler configured to randomize data contained within a second carrier signal at a second end of the link using a second scrambler such that a pseudo random sequence of data results that is different than a pseudo random sequence of data resulting at the first end of the link, a transmitting device configured to transmit the first and second carrier signals within a bandwidth to a remote receiver such that a composite carrier signal results, and a canceller configured to cancel the first carrier signal from the composite carrier signal using a cancellation technique such that the second carrier signal results.

Particular implementations may comprise one or more of the following additional features. At least one of the scramblers may be a feedback scrambler. The first and second scramblers may be different synchronous scramblers. The system may further comprise a linear feedback shift register (LFSR) configured to use a different set of feedback taps in at the first and second ends of the link. The synchronous scramblers may be further configured to use a different seed at the first and second ends of the link. The scramblers may be further configured to use a different gold code at each end of the link to randomize data at the first and second ends of the link.

Implementations of a system for reducing signal correlation within a symmetrical adaptive canceller link may comprise a first clock configured to have a first symbol clock frequency of a first carrier signal on a first end of the link, a second clock configured to have a second symbol clock frequency of a second carrier signal on a second end of the link such that the symbol clock frequencies are different, a transmitting device configured to transmit the first and second carrier signals within a bandwidth to a remote receiver such that a composite carrier signal results, and a canceller configured to cancel the first carrier signal from the composite carrier signal using a cancellation technique such that the second carrier signal results.

Implementations of a system for reducing signal correlation within a symmetrical adaptive canceller link may comprise a first modulator configured to modulate a first carrier signal at a first end of the link, a second modulator configured to modulate a second carrier signal at a second end of the link wherein the modulation pattern of the first and second modulators are without pattern repetition during a duration of signal travel between the first and second ends of the link, a transmitting device configured to transmit the first and second carrier signals within a bandwidth to a remote receiver such that a composite carrier signal results, and a canceller configured to cancel the first carrier signal from the composite carrier signal using a cancellation technique such that the second carrier signal results.

Particular implementations may comprise one or more of the following additional features. The first modulator may be further configured to generate random data at the first end of the link and insert the random data into the first carrier signal in place of a DVB-S2 physical layer dummy frame (PLDF) data pattern. The first modulator may be further configured to replace a data portion of a DVB-S2 physical layer dummy frame (PLDF) with a pseudo-noise (PN) pattern that is longer than the DVB-S2 PLDF while DVB-S2 PLDF headers remain unchanged. The modulator may be further configured to randomize a data portion of a DVB-S2 PLDF using one or more feedback scramblers.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 3A shows correct signal delay alignment for cancellation.

FIG. 3B shows incorrect signal alignment for cancellation.

DESCRIPTION

This disclosure, its aspects and implementations, are not limited to the specific components, frequency examples, or methods disclosed herein. Many additional components and assembly procedures known in the art consistent with correlation prevention techniques are in use with particular implementations from this disclosure. Accordingly, for example, although particular implementations are disclosed, such implementations and implementing components may comprise any components, models, versions, quantities, and/or the like as is known in the art for such systems, methods, and implementing components, consistent with the intended operation.

This disclosure provides several practical methods of preventing signal correlation, allowing successful signal acquisition and tracking of previously difficult or unstable satellite adaptive cancellation links. This disclosure is not narrowly applied only to DVB-S2 modulation, but will also apply to other systems whose similar construction can also cause correlation problems.

This disclosure relates generally to satellite communications and more particularly to a modern technique of increasing spectral efficiency by overlaying two carrier signals in a link as applied to duplex carrier links. This works for a link where both communicating earth stations are in the footprint of the same given satellite beam.

Figure 1A:
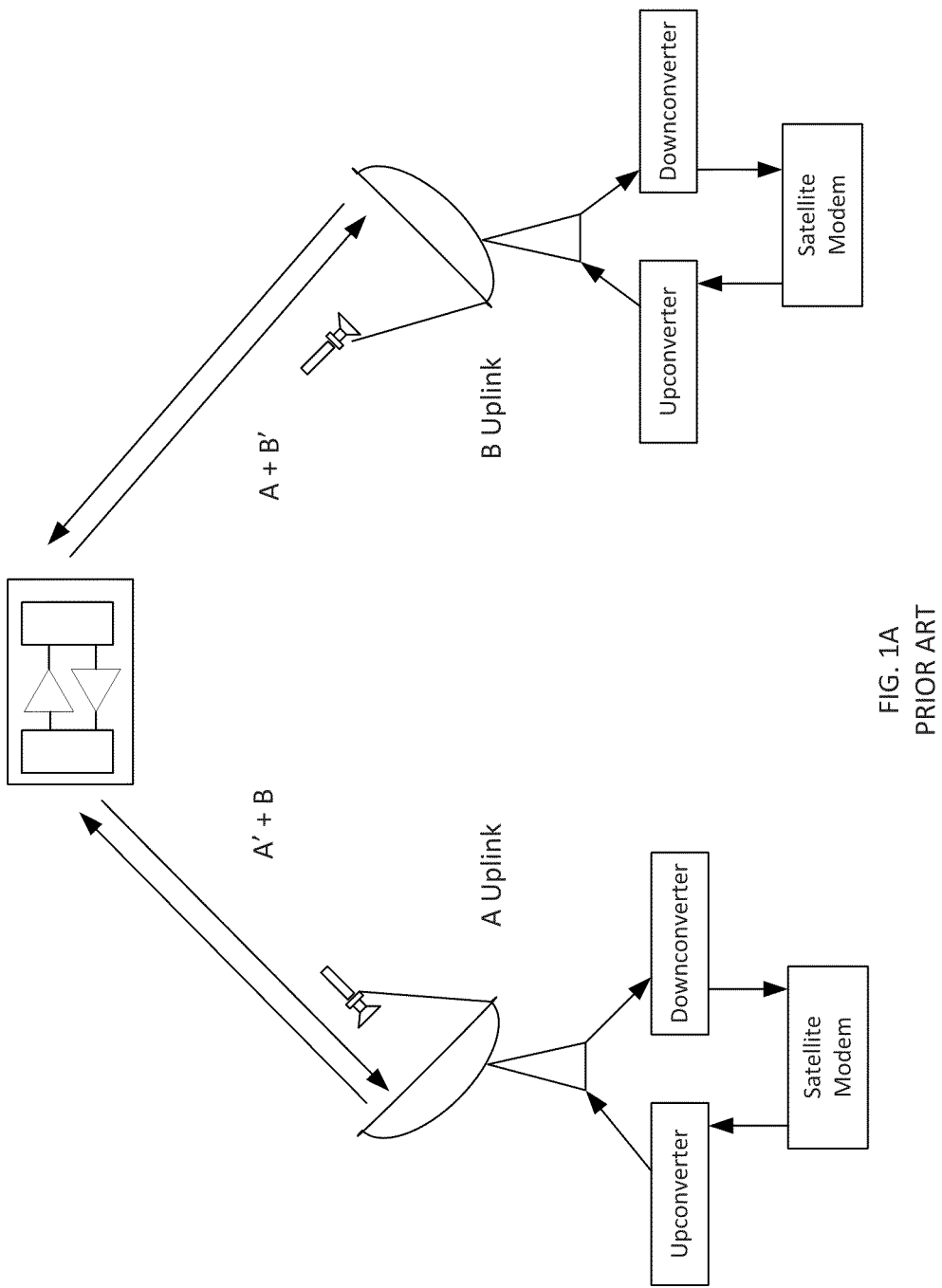
FIG. 1A depicts an implementation of a conventional full satellite link.
Figure 1B:
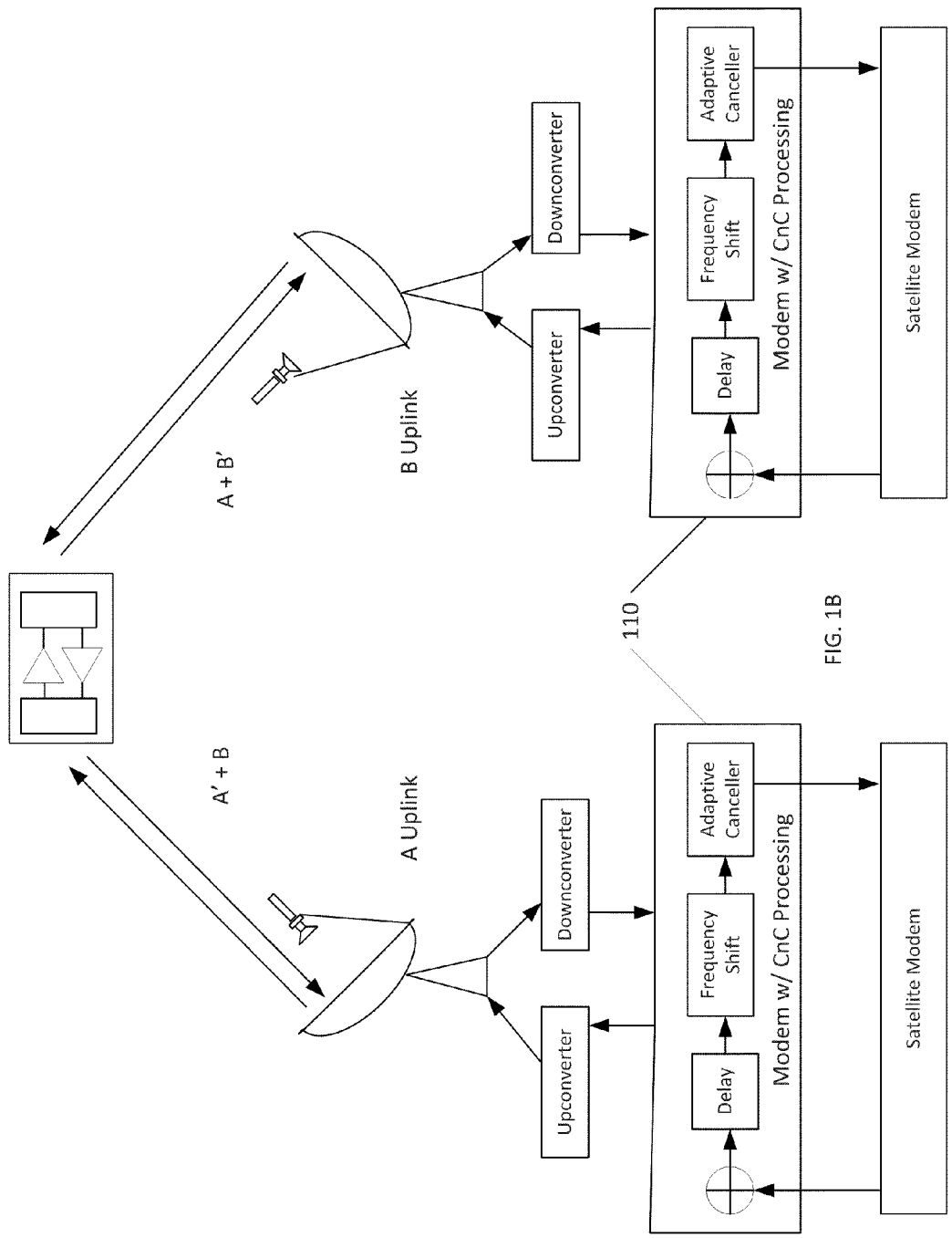
FIG. 1B depicts an implementation of a full duplex link using adaptive cancellation.

Overlaying two different carrier signals would normally prohibit communication as the carrier signals are seen as interference to each other in a conventional system such as that depicted in FIG. 1A, but the disclosed methods assume that components at each end of the satellite link, such as those contained within the modem 110 having carrier-in-carrier processing as shown in FIG. 1B, can delay an image of each transmitted signal and cancel it out of the received combined signal. This allows good reception of the signal from the distant end for both sides of the link.

Figure 2A:
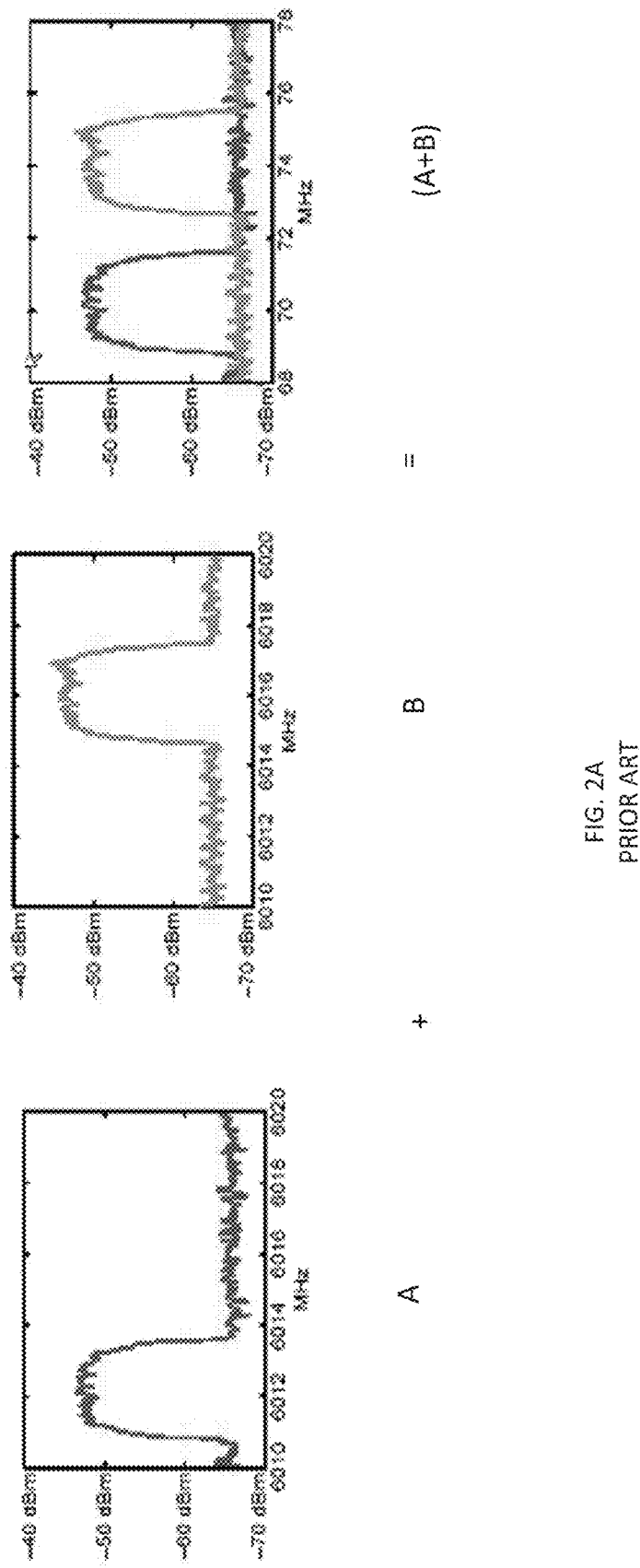
FIG. 2A-B shows the signal combinations of FIGS. 1A-B, respectively.
Figure 2B:
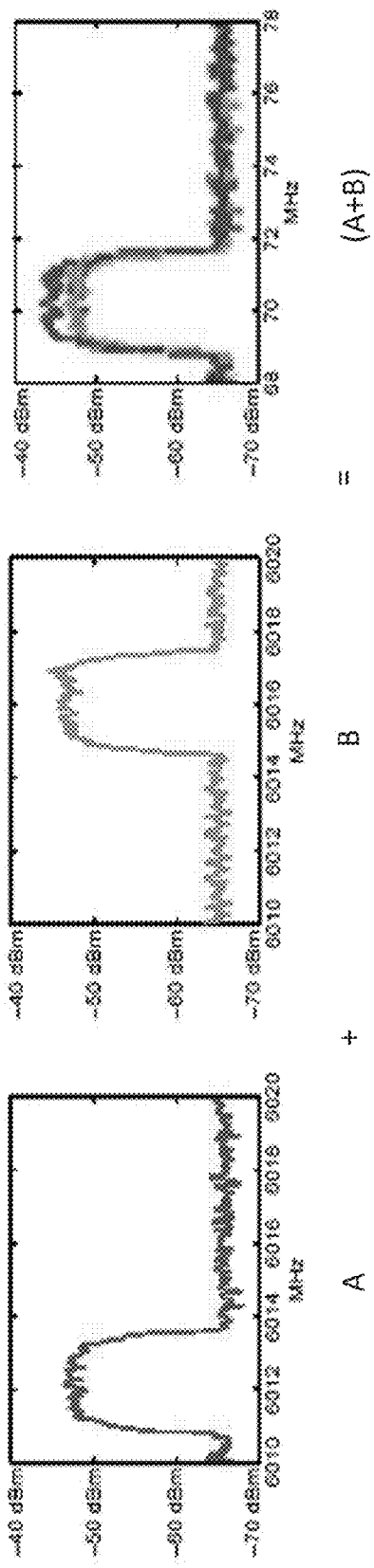
Figure 2C:
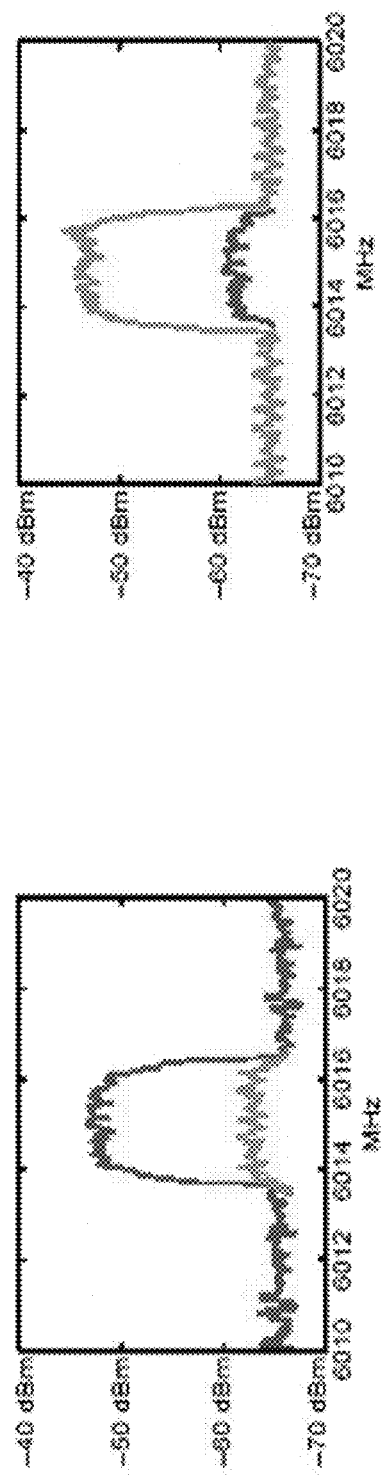
FIG. 2C shows output signals from ground terminals depicted in FIG. 1B.

Such a difference can be noted particularly with reference to FIGS. 2A-C. FIG. 2A depicts the combination of carrier signals A and B from terminals A and B as depicted using the conventional symmetrical adaptive cancellation link of FIG. 1A. FIG. 2B, however, shows the combination of carrier signals A and B using the disclosed methods within the system of FIG. 1B while FIG. 2C depicts the output signals after CnC processing at terminals A and B respectively.

Implementations of related techniquesare available commercially in such products as ComtechEFData's trademarked DoubleTalk™ Carrier-in-Carrier. U.S. Pat. Nos. 6,859,641 and 7,228,107, which provide further examples of these techniques are herein incorporated by reference in their entirety.

There are two specific carrier signal cancellation system problems that arise from correlation issues:

1. Tracking problems due to periodically cancelling the entire signal (not just interfering TX), causing dropouts. Even if a system is correctly locked and tracking, periodic correlation between the two carrier signals can cause signal dropouts. This is due to the fact that the canceller algorithm generally minimizes the resulting energy at the output of the process. If there is correlation between the signals, the canceller will cancel both the local interfering Tx signal (which is the desired effect) and the distant end Tx signal (which is not the desired effect) as they look essentially the same for a period of time. The effects described in this section can be manifested as a range of signal interruptions ranging from short error bursts to complete loss of synchronization requiring a relatively long re-acquisition procedure.

2. Initial acquisition problems due to aliasing in doing delay estimation. This is particularly acute during delay estimation as a repetitive signal such as, but not limited to Physical Layer Dummy Frames (PLDF's) will cause strong periodic correlation peaks in the time (delay) domain. This can make signal acquisition unlikely as the system can frequently try to lock onto a false delay peak and then lose canceller lock when real data is applied. This correlation problem is due to the interfering Tx signal having a periodic pattern that correlates with a delayed version of itself.

There are several implementations of methods of reducing correlation in a symmetrical adaptive canceller link contained in this disclosure. Implementations of techniques for the prevention of tracking problems in a satellite symmetrical adaptive cancellation link can be accomplished by methods such as, but not limited to, spectral inversion and additionally methods to randomize the signal on one side of the link in a different manner than on the other end of the link.

Spectral inversion is a property of radio frequency (RF) signals. Many links use coherent PSK/QAM modulations which involves putting baseband signals into Quadrature arms of a modulator. The resulting signal can be described as $S(t)=I_{baseband}(t)*Cos(\omega_0 t)+Q_{baseband}(t)*j\ Sin(\omega_0 t)$ where I baseband and Q baseband are data channels as a function of time and $\omega_0 t$ represents the RF carrier signal. Demodulation of such a signal mathematically comprises multiplying the RF signal by a carrier which ideally matches $Cos(\omega_0 t)+j\ Sin(\omega_0 t)$. Correctly done, the process produces two channels, $I_{baseband}(t)$ and $Q_{baseband}(t)$.

An RF signal may be converted several times in a signal chain by oscillators. This conversion process generally multiplies (mixes) a signal by an oscillator such that two sidebands are generated, one with $S(t)=I_{baseband}(t)*Cos(\omega 2_0 t)+Q_{baseband}(t)*j\ Sin(\omega 2_0 t)$ and the other with $S(t)=I_{baseband}(t)*Cos(\omega 2_0 t)-Q_{baseband}(t)*j\ Sin(\omega 2_0 t)$. If the sideband with the inverted Q channel is chosen, the signal is termed to be spectrally inverted. It is often difficult to know whether a given RF signal has been inverted or not, as the receiver may not know details about the transmit chain and inversion may occur there.

If the signal being demodulated has been spectrally inverted, the baseband signal will have one of the two channels inverted with respect to the original transmit signal. Most of the modulation types used for satellite applications are sensitive to spectral inversion and will not work unless the inversion is identified and corrected in the receiver. It is important to note that a receiver will generally know if receive data has been inverted. There are numerous methods of detecting inversion and correctly recovering the data, but there is another aspect of the property which is useful.

If two signals in a symmetrical adaptive carrier cancellation link periodically appear similar at the canceller due to either using framing or pilots (such as DVB-S2) then there can be times where both of them will be matched, causing the canceller to fail. In these cases, spectral inversion can be deliberately forced to occur at the point that the carrier cancellation signals are combined, typically, but not limited to, at the satellite itself. This action will cut the potential unintended cancellation in those cases substantially. Given that one of the two carriers is spectrally inverted with respect to the other, then even if they line up with the same patterns, spectral inversion will prohibit complete correlation. This can be seen by subtracting S(t) from Carrier A and from S(t) from Carrier B. If the data patterns are the same and there is no spectral inversion, correlation is high and the result is complete signal cancellation. If one of the signals is spectrally inverted with respect to the other, cancellation of one of the Quadrature arms can only occur along with reinforcement of the other arm. This effect limits the correlation that can occur to 50% of the value compared to the case of no spectral inversion.

The Carrier A and Carrier B signals need to be spectrally inverted at the point that they are combined together, in order for the forced spectral inversion technique to work. They may be combined on a satellite transponder, where there might be multiple additional spectral inversions in the downlink/demodulation chain, but those inversions will apply to the combination (summation) of the signals so correlation will still be minimized.

A signal may be intentionally spectrally inverted in the transmit chain by inverting one of the baseband Quadrature arms in a modulator, or deliberately choosing a set of upconversion chains such that the carriers from either side of the link are spectrally inverted with respect to each other at the point that they are combined. This is a manual implementation of a method of using spectral inversion.

It is also possible to have automatic methods of setting spectral inversion. Satellite adaptive cancellation circuits generally perform a search process to find and cancel the Tx signal from the local site. This search typically must be done for both cases, spectrally inverted and non-inverted in order to achieve cancellation. The canceller will therefore know if the Tx signal from its end of the link (near end) has been inverted.

The near end of the link will also know whether the modulation has been spectrally inverted before transmission. Lastly, the demodulator after the canceller must make a similar search as that of the canceller in order to correctly receive the carrier signal from the distant end. The combination of these three "flags" can be used to determine if the two carrier signals have been inverted with respect to each other at the combiner.

An implementation of a method of automatically setting an adaptive canceller link for proper spectral inversion is to set inversion at each end of the link by use of the following table:

| Tx Spectral Invert | Canceller Inverted | Demodulator Invert | Need to change Tx Invert |
|---|---|---|---|
| 0 | 0 | 0 | Yes |
| 0 | 0 | 1 | No |
| 0 | 1 | 0 | No |
| 0 | 1 | 1 | Yes |
| 1 | 0 | 0 | No |
| 1 | 0 | 1 | Yes |
| 1 | 1 | 0 | Yes |
| 1 | 1 | 1 | No |

The method has a drawback in that if both ends of a given link simultaneously sense that there is no spectral inversion at the combining point, each end of the link will try to correct the problem by changing its respective Tx spectral inversion. This problem may be solved in several ways.

One implementation of a method of preventing both ends of the link from changing the inversion is to allow each end of the link to make a change after a random "backoff" time. If the time is set long with respect to the satellite round trip delay, then even if the system inverts both ends of the link in error, one or the other side of the link will correct it, and the system will stabilize since the distant end of the link will sense that the problem has been solved before it attempts to make another change.

Another implementation of a method of solving the issue is to use a method of communication between the two ends of the link such as, but not limited to, an embedded message channel in the data. It is possible to arbitrate between the two transmitters by many methods. For example, in one implementation, it is possible to use a unique identifier in each modulator such as a serial number or MAC address to determine which side of the link will invert the Tx spectrum. A workable approach is that the unit with the lowest numerical MAC address will make the change. This is an example of an arbitration scheme and is not intended to limit the scope of the method.

Correlation may also be prevented by methods of randomizing the data by different methods at each of a link. Correlation may occur when there is a lack of data to transmit, which forces dummy patterns that are typically repetitive. Many systems use a synchronous scrambler to randomize input data. This type of scrambler generates the same pattern whenever it synchronizes, usually at each data or FEC frame. The pattern is a pseudo-random sequence typically generated by a Linear Feedback Shift Register (LFSR). This may be prevented by using a different scrambler such as a feedback scrambler. The use of a scrambler such as ITU V.35 or other suitable scramblers may also prevent the problem.

Some systems such as DVB-S2 have provision for many different scrambling patterns. DVB-S2 provides such scrambling by offering a choice of many different Gold Codes. The standard includes over 130,000 different choices. Many systems are configured to use the same code by default. Adaptive canceller correlation may be mitigated by intentionally setting different scrambler or Gold codes for each side of such a link.

Another implementation of a method of preventing tracking problems due to correlation in adaptive canceller links is possible in systems where the data is either packetized or where there is not a mandatory clocking link between terrestrial data and the modulation symbol clock. This is characteristic of systems such as DVB-S2 where synchronous systems are multiplexed using techniques such as attaching a time stamp to a data frame. This technique is sometimes called Input Stream Synchronization (ISSY) in the case of DVB-S2 modulation. Cancellation may be effectively prevented by deliberately applying a small frequency offset between the symbol clock rates on each side of a link. For example, a system with a symbol clock offset of approximately 2% is small enough so as not to cause a significant impact on spectral occupancy, but that offset is sufficient to mitigate tracking correlation.

Another implementation of a method of preventing correlation applies specifically to the case where the canceller search for the correct delay time may fail due to repetitive patterns in the Tx data from the local (near) side of the adaptive canceller link. This may be caused for example by using DVB-S2 modulations where due to lack of sufficient baseband data to send, the signal comprises Physical Layer Dummy Frames (PLDFs). These can cause the system to attempt to lock onto a time alias of the real delay due to the signal correlating periodically with itself due to pattern repetition. FIG. 3A provides clarification of correct alignment and FIG. 3B depicts aliased alignment due to the signal primarily comprising PLDFs. It is necessary to prevent repetition in the modulation pattern at each end of an adaptive canceller link to an interval longer than the satellite round trip delay time, which may be, but is not limited to 300 msec. This issue is important as it is not resolvable by methods of different randomization between the two carrier signals at the ends of the link.

One implementation of the disclosed methods allows for the local link to prevent sending PLDFs during canceller acquisition. This may be achieved by substituting random data into the modulator while acquiring such that PLDFs will not be transmitted. Another method involves changing the content of the pad (dummy) portion of a PLDF into random data without interfering with the header, in order to preserve DVB-S2 compatibility.

Canceller delay search may also fail in systems that use synchronous scrambling of the data before applying error correction coding. This may be prevented by using a different scrambler such as, but not limited to, a feedback scrambler. Feedback scramblers have the property that any difference in input data will randomly re-seed the scrambling sequence. The use of a scrambler such as ITU V.35, the product specification of which is herein incorporated by reference in its entirety, or any other appropriate scrambler may prevent the adaptive correlation problem.

The invention claimed is:

1. A method of reducing signal correlation in a symmetrical adaptive canceller link comprising:
spectrally inverting one of a first carrier signal and a second carrier signal by causing a spectral inversion of one of the first and second carrier signals using a modulator;
transmitting the first and second carrier signals within a bandwidth to a remote receiver using a transmitting device such that a composite carrier signal results; and
cancelling at least one of the first carrier signal from the composite carrier signal using a cancellation technique such that the second carrier signal results on one end of the link and the second carrier signal from the composite carrier signal using a cancellation technique such that the first carrier signal results on the opposite end of the link.

2. The method of claim 1, wherein the spectral inversion is caused by inverting a baseband quadrature arm of one of the first and second carrier signals.

3. The method of claim 1, wherein the spectral inversion is caused by swapping I and Q channels of one of the first and second carrier signals.

4. The method of claim 1, wherein the spectral inversion is caused by changing a phase of one of the first and second carrier signals at a quadrature mixer.

5. The method of claim 1, wherein the spectral inversion is caused by using an inverted upconverter.

6. The method of claim 1, further comprising:
determining whether to spectrally invert the first or second carrier signal by determining a state of a transmit signal spectral invert parameter, a local canceller spectral invert parameter, and a receive signal spectral invert parameter at each end of the adaptive canceller link according to the following chart:

| Tx Spectral Invert | Canceller Inverted | Demodulator Invert | Need to change Tx Invert |
|---|---|---|---|
| 0 | 0 | 0 | Yes |
| 0 | 0 | 1 | No |
| 0 | 1 | 0 | No |
| 0 | 1 | 1 | Yes |
| 1 | 0 | 0 | No |
| 1 | 0 | 1 | Yes |
| 1 | 1 | 0 | Yes |
| 1 | 1 | 1 | No. |

7. The method of claim 6, further comprising:
determining whether to spectrally invert the first or second carrier signal at a transmit end of the link; and
inverting the first or second carrier signal at the transmit end of the link in response to the determination.

8. The method of claim 6, further comprising delaying the spectral inversion at each end of the link based on a randomized timing schedule.

9. The method of claim 6, further comprising determining at which end of the link to spectrally invert a carrier signal and spectrally inverting the carrier signal at an end of the link in response to the determination.

10. A system for reducing signal correlation in a symmetrical adaptive canceller link comprising:
a modulator configured to spectrally invert one of a first carrier signal and a second carrier signal by causing a spectral inversion of one of the first and second carrier signals;
a transmitter configured to transmit the first and second carrier signals within a bandwidth to a remote receiver such that a composite carrier signal results; and
a canceller configured to cancel at least one of the first carrier signal from the composite carrier signal using a cancellation technique such that the second carrier signal results on one end of the link and the second carrier signal from the composite carrier signal using a cancellation technique such that the first carrier signal results on the opposite end of the link.

11. The system of claim 10, wherein the modulator is further configured to cause the spectral inversion by inverting a baseband quadrature arm of one of the first and second carrier signals.

12. The system of claim 10, wherein the modulator is further configured to cause the spectral inversion by swapping I and Q channels of one of the first and second carrier signals.

13. The method of claim 10, wherein the modulator is further configured to cause the spectral inversion by changing a phase of one of the first and second carrier signals at a quadrature mixer.

14. The system of claim 10, further comprising an inverted upconverter configured to cause the spectral inversion by using an inverted upconverter.

15. The system of claim 10, wherein the modulator is further configured to determine whether to spectrally invert the first or second carrier signal by determining a state of a transmit signal spectral invert parameter, a local canceller spectral invert parameter, and a receive signal spectral invert parameter at each end of the adaptive canceller link according to the following chart:

| Tx Spectral Invert | Canceller Inverted | Demodulator Invert | Need to change Tx Invert |
|---|---|---|---|
| 0 | 0 | 0 | Yes |
| 0 | 0 | 1 | No |
| 0 | 1 | 0 | No |
| 0 | 1 | 1 | Yes |
| 1 | 0 | 0 | No |
| 1 | 0 | 1 | Yes |
| 1 | 1 | 0 | Yes |
| 1 | 1 | 1 | No. |

16. The system of claim 15, wherein the modulator is further configured to determine whether to spectrally invert the first or second carrier signal at a transmit end of the link and to invert the first or second carrier signal at the transmit end of the link in response to the determination.

17. The system of claim 15, wherein the modulator is further configured to delay the spectral inversion at each end of the link based on a randomized timing schedule.

18. The system of claim 15, wherein the modulator is further configured to determine at which end of the link to spectrally invert a carrier signal and spectrally invert the carrier signal at an end of the link in response to the determination.

* * * * *